United States Patent Office 3,417,144
Patented Dec. 17, 1968

3,417,144
NOVEL OXIDATION PROCESSES
Roger P. Cahoy, Merriam, and Donald M. Coyne, Prairie Village, Kans., assignors, by mesne assignments, to Gulf Oil Corporation, Pittsburgh, Pa., a corporation of Pennsylvania
No Drawing. Continuation of application Ser. No. 224,848, Sept. 19, 1962. This application Dec. 19, 1966, Ser. No. 603,059
5 Claims. (Cl. 260—604)

This is a continuation of S.N. 224,848 filed Sept. 19, 1962, and now abandoned.

This invention relates to processes of providing unsaturated aldehyde compounds. More particularly, it relates to processes of providing acrolein and methacrolein by the oxidation of olefins.

Acrolein and methacrolein produced by the processes of this invention are common aldehydes having well-known utilities. For example, they can be readily converted by known processes to the highly useful acrylic ester compounds, viz., alkyl acrylate and methacrylate esters.

Provided by this invention are novel processes of providing an unsaturated aldehyde of the group consisting of acrolein and methacrolein by the oxidation of an olefin of the group consisting of propylene and isobutylene, respectively, by contacting a gaseous stream of oxygen and said olefin at an elevated oxidizing temperature with one or more oxidation catalyst represented by the formula:

$$Cr_a M_b N_{12} O_c$$

wherein M represents a silicon or a phosphorus atom; N represents a molybdenum, vanadium, or a tungsten atom; and the letters $a$, $b$, and $c$ represent the amounts of the respective atoms as follows: $a$ represents a number in the range from about one to about 20 (preferably from about five to about 15); $b$ represents a number in the range from 0.5 to about five (preferably from about 0.5 to about two); and $c$ is a number in the range from about 30 to about 70 (preferably from about 40 to about 60). A further preferred catalyst has the empirical formula of about the following:

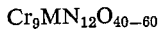

$$Cr_9 M N_{12} O_{40-60}$$

In the above formulas, the catalyst complexes in which N represents molybdenum are preferred.

The metals of the catalyst complex are believed to be largely if not essentially totally in the form of their respective oxides. This is indicated by X-ray diffraction patterns and other data. However, it is not meant to be bound by such theory or belief.

The oxygen values recited are determined by calculation on basis of the oxygen content of oxides of the constituent metal atoms, assuming they are fully present in the complexes as their respective oxides. The assumed oxides are $Cr_2O_3$, $P_2O_5$, $MoO_3$, $WO_3$ and $V_2O_5$. A portion of additional metal atoms can be incorporated at times into the above defined catalyst complexes without substantially hindering the oxidative processes.

Representative catalysts can be prepared as described hereinafter in greater detail, by starting with a soluble chromium salt (e.g., chromium nitrate), and a source of M and N atoms of the catalyst complexes (e.g., phosphomolybdic acid).

The catalysts employed in this invention can be prepared following conventional procedures of catalyst preparation. For example, a general procedure found suitable in providing presently preferred catalyst complexes of this invention, is as follows: Both the agent or agents selected for use in the catalyst preparation to provide the M and N atoms (such as phosphomolybdic acid), and a water-soluble chromium compound such as chromium nitrate, are dissolved in a minimum volume of water. In the preparation, the minimum aqueous mixture can be added to a heated silicon carbide aggregate in such a manner that the reagents will coat or form a film on the aggregate particles. In forming the coated aggregates, it is desirable that the aqueous mixture of the catalyst source atoms be added to the heated aggregates at the same rate at which the water thereof is evaporated. The support suitably has about one to about ten percent by weight of the catalyst complex, with usually three to about eight percent desirable. The aggregate catalyst particles are suitably dried and fired in the usual manner as by heating to about 1000° F. Other alternative procedures can be employed to provide suitable catalyst preparations and will be apparent to those skilled in the art from the disclosures made herein.

In another illustrative catalyst preparation, a silica sol can be employed instead of silicon carbide aggregate as a support source. A silica sol having a usual concentration, e.g., a 30 percent by weight of silica, can be conveniently used. The pH of the silica sol, if necessary, is neutralized by the addition of an acid, suitably nitric acid. The same aqueous solution, as used above, is added slowly with vigorous stirring to the neutralized silica sol. The silica sol mixture is warmed suitably at a temperature of about 70° C. to 100° C. The silica sol mixture will form by a co-gelling action a permanent gel. The formed gel then can be dried and fired in the usual manner to provide the final catalyst. Other procedures can be employed, such as spray drying and the like, to provide suitable catalyst preparations.

Various suitable agents can be employed as sources of the atom constituents of the catalyst complexes of this invention. Since present evidence indicates the final activated catalysts, as used in the hereby provided processes, contain the constituent metal atoms as a complex of their respective oxides, presumably the respective oxides could theoretically be employed as the starting materials. However, whether or not the appropriate combination of oxides of e.g., chromium, silicon, the molybdenum, could in fact be employed to provide a catalyst of this convention, is not presently completely established.

In respect to chromium, as mentioned above, water-soluble salts of chromium which are capable of disintegrating to the oxide of chromium on firing the catalyst but which do not leave an interfering residue have been found suitable as chromium atom sources. Chromium nitrate is a presently preferred salt. Source agents for the M and N atoms include such agents as phosphomolybdic acid, molybdic acid, ammonium molybdate, phosphoric acid, polyphosphoric acid, silicomolybdic acid, phosphotungstic acid, tungstic acid, silicotungstic acid, phosphovanadic acid, silicovanadic acid, ammonium vanadate, and other suitable sources having adequate water-solubility (the names of the acids are used in the sense of their usual meanings to the chemical art).

In respect to catalyst supports, in addition to silicon carbide and silica gel, which are desirable supports, other conventional supports which are inert in the processes of this invention can be employed. Such materials included diatomaceous earth, certain clays, Alundum, alumina-silica, porcelain alumina, titania, and the like. The support can vary widely in surface area, e.g., the support can have a high or low surface area. By "low surface area" is meant less than about five square meters of surface per gram of support, whereas by "high surface area" is meant more than about five square meters of surface per gram of support.

Although it is preferred to employ a supported catalyst, it is within the scope of this invention to include the hereinabove named catalyst compositions in an unsupported form insofar as they catalyze the oxidation of olefins to desired carbonylic compounds.

The catalyst preparations, particularly the supported catalysts, are subdivided if desirable as by crushing or grinding to provide a suitable particle size for the processes. It has been found that a particle size of the catalyst is preferably of a size largely falling in a mesh range of about four to about 16 in the U.S. Sieve Series when a fixed bed technique is employed.

By employing processes of this invention excellent conversions of the olefin are realized and, likewise, high yields of the desired carbonylic compound or compounds are obtained. By "yield" of the carbonylic compound is meant, in the usual sense, the percentage of the converted olefin obtained as the desired carbonylic compound.

The processes of this invention are preferably conducted in a continuous manner by passing the gaseous feed stream through an amount of the supported catalyst in a fixed bed. In such an arrangement, conventional oxidation apparatuses enabling a continuous procedure can be employed. A fluidized bed of catalyst can be used also. Even though the continuous procedures are preferred, batch procedures and the like which will provide the herein described oxidations are included within the scope of this invention.

The reaction temperature employed may vary considerably. The particular reaction temperature used depends upon the catalyst used, the olefin being oxidized, the flow rate of the gas feed, the contact time of the olefin with the catalyst, and other factors. In general, when operating at pressures near atmospheric, temperatures in the range of about 350° to about 650° C. are effective. A preferred temperature range in oxidation of isobutylene and propylene has been found to be about 400° to about 600° C. The contact time of the olefin can vary considerably. Broadly speaking, it can vary from about 0.1 up to about 20 seconds. The optimum contact time must be individually determined depending upon the ratio of the gas feed, reaction temperature, the olefin, the particular catalyst employed, and like factors. Generally, a 0.05- to about a five-second contact time is sufficient and is preferred.

A molar ratio of oxygen to olefin between about 5:1 to 0.5:1 (preferably ordinarily about 1:1) generally gives the most satisfactory results. Illustratively, in methacrolein preparation, a preferred ratio of oxygen to olefin is about 1:1 on a volume basis. The oxygen used in the process may be derived from any suitable source including, of course, oxygen gas. However, air is a satisfactory source and is preferred in view of economic considerations.

The addition of water to the olefin feed has been found to be highly desired inasmuch as an improved conversion and yield of the desired product is usually realized. Generally, a ratio of olefin to water in the reaction mixture of 1:0.5 to 1:10 (by volume) will give satisfactory results. For example, a ratio of 1:1 to 1:5 has been found to be optimum when converting isobutylene to methacrolein. The water, of course, will be in the vapor phase during the reaction. Therefore, an olefin feed having a ratio of olefin:oxygen:water of 1:0.5:0.5 to 1:5:10 has been found suitable.

Inert diluents may be present in the feed without interfering with the oxidation. A much desired advantage of the processes of this invention is the ability to oxidize, for example, isobutylene, in the presence of other hydrocarbons, such as isobutane. This is an important quality since utilizable petroleum gas streams of isobutylene, for example, commonly contain a high precentage of saturated and other hydrocarbons.

In large scale operation, it is preferred to carry out the process in a continuous manner. In commercial operations unreacted olefin often is recovered and is recycled. The catalyst will require regeneration or replacement from time to time.

The unsaturated carbonyl products can be suitably isolated from the reaction stream by any appropriate means. For example, the discharge stream can be passed through "scrubbers" containing water or other appropriate solvents. The desired carbonylic compound can be recovered from the scrubber solution by extraction, by distillation, or by other conventional means. The efficiency of the scrubbing operation may be improved when water is employed as the scrubbing agent by adding a suitable wetting agent to the water. It is desired to include suitable inhibitors as is cusomary to prevent polymerization of the unsaturated oxidation products.

The following illustrative examples are presented in illustration of the processes and catalyst compositions of this invention but not in limitation thereof.

Example 1

A chromium-phosphorus-molybdenum catalyst is prepared in the following manner: 850 g. of a commercial silica sol (containing 30% by weight of silica) is neutralized with nitric acid. To the neutralized silica sol with stirring, are added 252 g. of chromium nitrate nonahydrate and 128 g. of phosphomolybdic acid both dissolved in a minimum amount of water. The resulting mixture is stirred and is heated at about 80° C. until a permanent gel is formed. The formed gel is pre-dried for 8 hours in an oven maintained at 100° C. A final firing is conducted in a Globar furnace starting at 300° F. The final heating or firing is carried out for two hours at 1000° F. The fired catalyst is cooled, is crushed, and is sieved. The crushing is conducted to provide a major particle size on sieving of 4–16 mesh in the U.S. Sieve Series. The final catalyst composition contains 40 percent by weight of the catalyst having the empirical formula $Cr_9PMo_{12}O_{52}$.

A portion of the catalyst (300 ml.) is placed in a conventional oxidation reactor having a capacity of 400 ml. In the oxidation, a gaseous mixture is employed which has the following composition by volume: 11.1 percent isobutylene; 58.9 percent air; and 30.0 percent steam. A reaction temperature of 381° C. is employed. The contact time of the isobutylene feed with the catalyst is 5.6 seconds. The product is recovered in the customary manner employing water scrubbers and is analyzed by the conventional Orsat and GLC methods ("GLC" means "gas liquid chromatography"). The conversion of isobutylene is 12 percent and the yield of methacroelin on the basis of the amount of isobutylene converted is 20 percent. The above oxidation process can be repeated in conversion of propylene to acrolein.

The above process can also be repeated by employing in the catalyst preparation an aluminum oxide support sold by the Carborundum Company under the designation "Grade AMC."

Example 2

Oxidation of isobutylene is carried out with the catalyst and by the procedure of Example 1 employing a feed having the composition of 12.3 percent isobutylene, 55.0 percent air, and 32.7 percent steam, a contact time of 5.1 seconds, and a reaction temperature of 396° C. An isobutylene conversion of 26 percent and a yield of methacrolein of 18 percent are obtained.

Example 3

By the catalyst preparation procedure of Example 1, the following agents are used to provide a catalyst composition comprising 60 percent of the catalyst of the empirical formula $Cr_9SiW_{12}O_{51.5}$: 360 g. of chromium nitrate nonahydrate, 331.2 g. of silicomolybdic acid and 783 g. of the neutralized silica gel (Example 1). The yield of catalyst is 581 g. The catalyst is obtained in a 4–6 mesh particle size.

Oxidation of isobutylene by the prepared catalyst is carried out by the procedure of Example 1 by employing a feed of 7.8 percent isobutylene, 27.6 percent air and 64.6 percent steam, a contact time of 4.0 seconds, and a reaction temperature 560° C. to obtain an isobutylene conversion of 24 percent and a yield of methacrolein of 9 percent.

The above oxidation process is repeated in conversion of propylene to acrolein.

Example 4

A mixture comprising 21.6 g. chromium nitrate nonahydrate and 14.0 g. phosphomolybdic acid are dissolved in a minimum quantity of water and are added to 328 g. of 4–6 mesh silicon carbide aggregate. The particles during coating are heated and are stirred. The addition of the liquid mixture is made at a rate to permit evaporation of the added liquid as it was added. The catalyst is fired for two hours at 1000° F. The yield of catalyst is 344 g.

Oxidation of isobutylene with 200 ml. of catalyst is carried out by the procedure of Example 1 employing a feed having the composition of 9.6 percent isobutylene, 39.4 percent air, and 51.0 percent steam, a contact time of 2.2 seconds, and a reaction temperature of 530° C. An isobutylene conversion of 25 percent and a yield of methacrolein of 20 percent are obtained.

Example 5

The catalyst preparation and oxidation process of Example 1 can be repeated using an equimolar amount of ammonium phosphovanadate [prepared by the process described by A. Rosenheim and M. Pieck, Z. Anorg. Allgem. Chem. 98, 223 (1916)] instead of the phosphomolybdic acid. The catalyst has an empirical formula of $Cr_9PV_{12}O_{46}$.

Example 6

The catalyst preparation and oxidation process of Example 1 can be repeated employing in the catalyst preparation an equimolar quantity of silicomolybdic acid instead of the phosphomolybdic acid to provide a catalyst having the empirical formula $Cr_9SiMo_{12}O_{51.5}$.

Example 7

The catalyst preparation and oxidation process of Example 1 can be repeated employing in the catalyst preparation $H_7PW_{12}O_{42}$ instead of the phosphomolybdic acid to provide a catalyst having the empirical formula $Cr_9PW_{12}O_{52}$.

We claim:
1. A process for manufacturing methacrolein by contacting a gaseous stream of isobutylene and from about 5 to 0.5 moles of oxygen per mole of isobutylene at a temperature within the range of about 350° to 650° C. for a period of about 0.1 to 20 seconds with an oxidation catalyst prepared by coating a support selected from silica, alumina and silicon carbide with an aqueous solution of a water-soluble chromium compound which is capable of thermal decomposition to chromium oxide and a compound selected from phosphomolybdic acid, silicomolybdic acid, ammonium phosphovanadate and phosphotungstic acid, drying and heating to about 1000° C. to produce a mixed oxide catalyst composition which contains from about 5 to 15 atoms of chromium for every 12 atoms of a metallic element selected from molybdenum, vanadium and tungsten.

2. A process according to claim 1 in which the mixed oxide catalyst composition has the empirical formula $Cr_9PMo_{12}O_{52}$.

3. A process according to claim 1 in which the mixed oxide catalyst composition has the empirical formula $CR_9PV_{12}O_{46}$.

4. A process according to claim 1 in which the mixed oxide catalyst composition has the empirical formula $Cr_9SiMo_{12}O_{51.5}$.

5. A process according to claim 1 in which the mixed oxide catalyst composition has the empirical formula $Cr_9PW_{12}O_{52}$.

References Cited

UNITED STATES PATENTS 2,941,007   6/1960   Callahan et al. _____ 260—604

FOREIGN PATENTS 605,502   10/1961   Belgium.
119,518   10/1918   Great Britain.

OTHER REFERENCES

Handbook of Chemistry and Physics, 41st edit., 1959–1960, pages 562–564.

Derwent, Belgian Patent Report, No. 82B issued Dec. 22, 1961, p. A14 (patent issued June 28, 1961).

LEON ZITVER, *Primary Examiner.*

R. LILES, *Assistant Examiner.*

U.S. Cl. X.R.

252—437, 458